(12) United States Patent
Pierallini

(10) Patent No.: US 9,410,619 B2
(45) Date of Patent: Aug. 9, 2016

(54) CONTROL OF OPERATION OF AN AUTOMOBILE GEAR SHIFT SYSTEM

(71) Applicant: FIAT GROUP AUTOMOBILES S.p.A., Turin (IT)

(72) Inventor: Mauro Pierallini, Turin (IT)

(73) Assignee: FIAT GROUP AUTOMOBILES S.P.A., Turin (IT)

( * ) Notice: Subject to any disclaimer, the term of this patent is extended or adjusted under 35 U.S.C. 154(b) by 94 days.

(21) Appl. No.: 14/316,038

(22) Filed: Jun. 26, 2014

(65) Prior Publication Data
US 2015/0006040 A1 Jan. 1, 2015

(30) Foreign Application Priority Data

Jun. 26, 2013 (IT) .......................... TO2013A000526

(51) Int. Cl.
| | |
|---|---|
| *F16H 61/02* | (2006.01) |
| *B60W 10/20* | (2006.01) |
| *B60W 10/11* | (2012.01) |
| *B60K 20/06* | (2006.01) |
| *F16H 59/02* | (2006.01) |
| *F16H 59/58* | (2006.01) |

(52) U.S. Cl.
CPC ............ *F16H 61/0213* (2013.01); *B60K 20/06* (2013.01); *B60W 10/11* (2013.01); *B60W 10/20* (2013.01); *F16H 59/02* (2013.01); *B60K 2350/1016* (2013.01); *F16H 59/58* (2013.01); *F16H 2059/0247* (2013.01)

(58) Field of Classification Search
CPC .... F16H 61/0213; F16H 61/68; B60W 10/11; B60W 10/20
See application file for complete search history.

(56) References Cited

U.S. PATENT DOCUMENTS

| 5,823,052 A * | 10/1998 | Nobumoto | .......... F16H 59/0204 74/335 |
| 5,868,033 A * | 2/1999 | Nishino | ................. F16H 61/16 477/97 |
| 6,012,352 A * | 1/2000 | Ishii | .................... F16H 59/0204 200/61.88 |

(Continued)

FOREIGN PATENT DOCUMENTS

| EP | 1 146 257 | 10/2001 |
| EP | 1 990 660 | 11/2008 |

(Continued)

OTHER PUBLICATIONS

Italian Search Report dated Mar. 18, 2014 for corresponding Application No. IT TO20130526 filed Jun. 26, 2013.

*Primary Examiner* — Tuan C. To
(74) *Attorney, Agent, or Firm* — Gottlieb, Rackman & Reisman, P.C.

(57) ABSTRACT

A gear shift system for a motor vehicle with a steering wheel. The gear shift system includes gear shift devices rotationally integral with the steering wheel and an electronic control device. Each of the gear shift devices is operable by a driver of the motor vehicle to carry out at least one respective gear shift function associated with the respective gear shift device. The electronic control unit is configured to receive a magnitude indicative of a current steering wheel angle, determine, on the basis of the received magnitude, whether the current steering wheel angle satisfies predefined conditions, and, if it determines that the current steering wheel angle satisfies the predefined conditions, reconfigure the gear shift functions associated with the gear shift devices.

8 Claims, 4 Drawing Sheets

(56) References Cited

U.S. PATENT DOCUMENTS

| | | | | |
|---|---|---|---|---|
| 6,076,414 A * | 6/2000 | Tabata | ............... | F16H 59/10 74/335 |
| 8,313,405 B2 * | 11/2012 | Bazyn | ............... | F16H 15/52 475/185 |
| 8,317,651 B2 * | 11/2012 | Lohr | ............... | F16H 15/52 310/90.5 |
| 8,585,528 B2 * | 11/2013 | Carter | ............... | F16H 15/52 475/192 |
| 8,818,661 B2 * | 8/2014 | Keilers | ............... | B60W 10/08 476/40 |
| 8,849,525 B2 * | 9/2014 | Nishida | ............... | F16H 61/68 180/336 |
| 8,888,643 B2 * | 11/2014 | Lohr | ............... | F16H 15/50 475/189 |
| 2004/0192493 A1 * | 9/2004 | Nitta | ............... | F16H 59/58 475/331 |
| 2005/0000738 A1 * | 1/2005 | Gehring | ............... | B62D 15/0285 180/14.1 |
| 2008/0221760 A1 * | 9/2008 | Wakamatsu | ............... | F16H 61/18 701/52 |
| 2012/0144947 A1 | 6/2012 | Herbert et al. | | |
| 2013/0297159 A1 * | 11/2013 | Nishida | ............... | F16H 61/68 701/52 |
| 2014/0116179 A1 * | 5/2014 | Sata | ............... | B60K 20/06 74/473.31 |

FOREIGN PATENT DOCUMENTS

| | | | |
|---|---|---|---|
| JP | 01113561 A | * | 5/1989 |
| JP | 2000 272371 | | 10/2000 |
| JP | 2001018824 A | * | 1/2001 |
| JP | 2007069634 | | 3/2007 |
| WO | 92/06860 | | 4/1992 |

* cited by examiner

CONTROL OF OPERATION OF AN AUTOMOBILE GEAR SHIFT SYSTEM

TECHNICAL FIELD OF THE INVENTION

The present invention relates, in general, to the control of operation of an automotive gear shift system and, in particular, to the control of operation of an automotive gear shift system comprising devices which are rotationally integral with the steering wheel and which are operable by the driver, manually or by means of one or more fingers, to control the gear shift.

STATE OF THE ART

As is known, many motor vehicles provided with a servo-actuated transmission, whether or not it is automatic or automated, are equipped with driver-operable gear shift systems. Such systems generally comprise devices arranged on or behind the steering wheel which allow the driver to control the gear shift, manually (i.e., by means of a hand) or by means of one or more fingers, without ever having to remove, or, in any case, move his/her hands away, from the steering wheel.

In particular, gear shift systems for motor vehicles with servo-actuated transmission are known which comprise paddles that are arranged on, or behind, the steering wheel and which are operable by the driver, manually (i.e., by means of a hand) or by means of one or more fingers, to control sequential shift of gears, i.e., of gear ratios. Such gear shift systems for motor vehicles with servo-actuated transmission normally comprise a pair of paddles wherein:
 a first paddle is arranged on, or behind, the steering wheel and allows the driver, when the transmission as actuated in semi-automatic mode, to downshift; and
 the other paddle is arranged on, or behind, the steering wheel and allows the driver, when the transmission is actuated in semi-automatic mode, to upshift.
 Conveniently the gear shift paddles:
 can be arranged on the steering wheel thereby being rotationally (i.e., angularly) integral with the latter; or
 can be arranged behind the steering wheel and can be rotationally integral with the steering wheel; for example, they can be coupled to the steering column so as to be rotationally integral with the latter and, thence, also with the steering wheel; or
 can be arranged behind the steering wheel and can be rotationally (i.e., angularly) immobile (i.e., stationary) with respect to the steering wheel (namely, in such a manner so as not to rotate when the steering wheel is rotated by the driver); for example, they can be installed on the so-called driver's switch control unit (or switch assembly) or coupled to the steering column so as to be rotationally immobile with respect to the steering wheel.

In this respect, United States Patent Application US 2012/0144947 A1 describes, for example, a driver-operable automotive device for selectively and alternatively connecting the gear shift paddles:
 to the steering column so that said paddles are rotationally immobile with respect to the steering column and, thence, also with respect to the steering wheel; or
 to the steering column so that said paddles are rotationally integral with the steering wheel.

The use of a pair of paddles rotationally integral with the steering wheel can, in certain cases, be difficult for the driver due to the rotation of the steering wheel and, thence, to the corresponding rotation of the pair of paddles. For example, if the driver keeps the steering wheel rotated by 180° with respect to a predefined angular reference position of the steering wheel (for example, the angular position of the steering wheel which causes the motor vehicle to go straight ahead), the two paddles are also rotated by 180° and thereby take on with respect to the driver, substantially inverted positions with respect to the ones taken on when the steering wheel is in the predefined angular reference position. Such a situation can confuse the driver and, thence, cause the driver to erroneously operate the paddle for downshifting, thinking that it is the paddle for upshifting and vice versa.

Japanese Patent Application JP 2007069634 A proposes a solution to such a problem. In particular, JP 2007069634 A describes a mechanism which:
 allows the pair of paddles to rotate integrally with the steering wheel from a predefined angular reference position of the steering wheel up to a predefined maximum; and
 block the pair of paddles in a predefined position regardless of the position of the steering wheel, when the rotation of the steering wheel exceeds a predefined quantity.

OBJECT AND SUMMARY OF THE INVENTION

Object of the present invention is that of providing a solution to the aforesaid problem of the gear shift paddles rotationally integral with the steering wheel, which solution is alternative to the ones currently known, in particular is alternative to the solution proposed in the Japanese Patent Application JP 2007069634 A.

The aforesaid object is achieved by the present invention in so far as it relates o an automotive gear shift system.

In particular, the present invention relates to a gear shift system for a motor vehicle with a steering wheel. Said gear shift system comprises:
 gear shift devices rotationally integral with the steering wheel, each of which is operable by a driver of the motor vehicle to carry out at least one respective gear shift function associated with said gear shift device; and
 an electronic control unit configured to
  receive a magnitude indicative of a current steering wheel angle,
  determine, on the basis of the received magnitude, whether the current steering wheel angle satisfies predefined conditions, and,
  if it determines that the current steering wheel angle satisfies the predefined conditions, reconfigure the gear shift functions associated with the gear shift devices.

Preferably, the gear shift devices comprise a first gear shift device with which at least one first gear shift function is associated, and a second gear shift device with which at least one second gear shift function is associated; furthermore, the electronic control unit is preferably configured to:
 if it determines that the current steering wheel angle does not satisfy the predefined conditions, maintain
  the first gear shift function associated with the first gear shift device, and
  the second gear shift function associated with the second gear shift device;
 if it determines that the current steering wheel angle satisfies the predefined conditions, associate
  the second gear shift function with the first gear shift device, and
  the first gear shift function with the second gear shift device.

Conveniently, the first gear shift function is a downshift function and the second gear shift function is an upshift function.

Preferably, the electronic control unit is configured to determine that the current steering wheel angle satisfies the predefined conditions if it determines, on the basis of the received magnitude, that the absolute value of the current steering wheel angle exceeds a predefined threshold.

Again preferably, the gear shift system comprises user interface means operable to enable and disable the reconfiguration of the gear shift functions associated with the gear shift devices by the electronic control unit.

BRIEF DESCRIPTION OF THE DRAWINGS

For a better understanding of the present invention, some preferred embodiments, provided by mere way of explicative and non-limiting example, will now be illustrated with reference to the accompanying drawings (not in scale), in which FIGS. 1, 2, 3 and 4 schematically illustrate an automotive gear shift system according to a preferred embodiment of the present invention.

DETAILED DESCRIPTION OF PREFERRED EMBODIMENTS OF THE INVENTION

Figure 1:
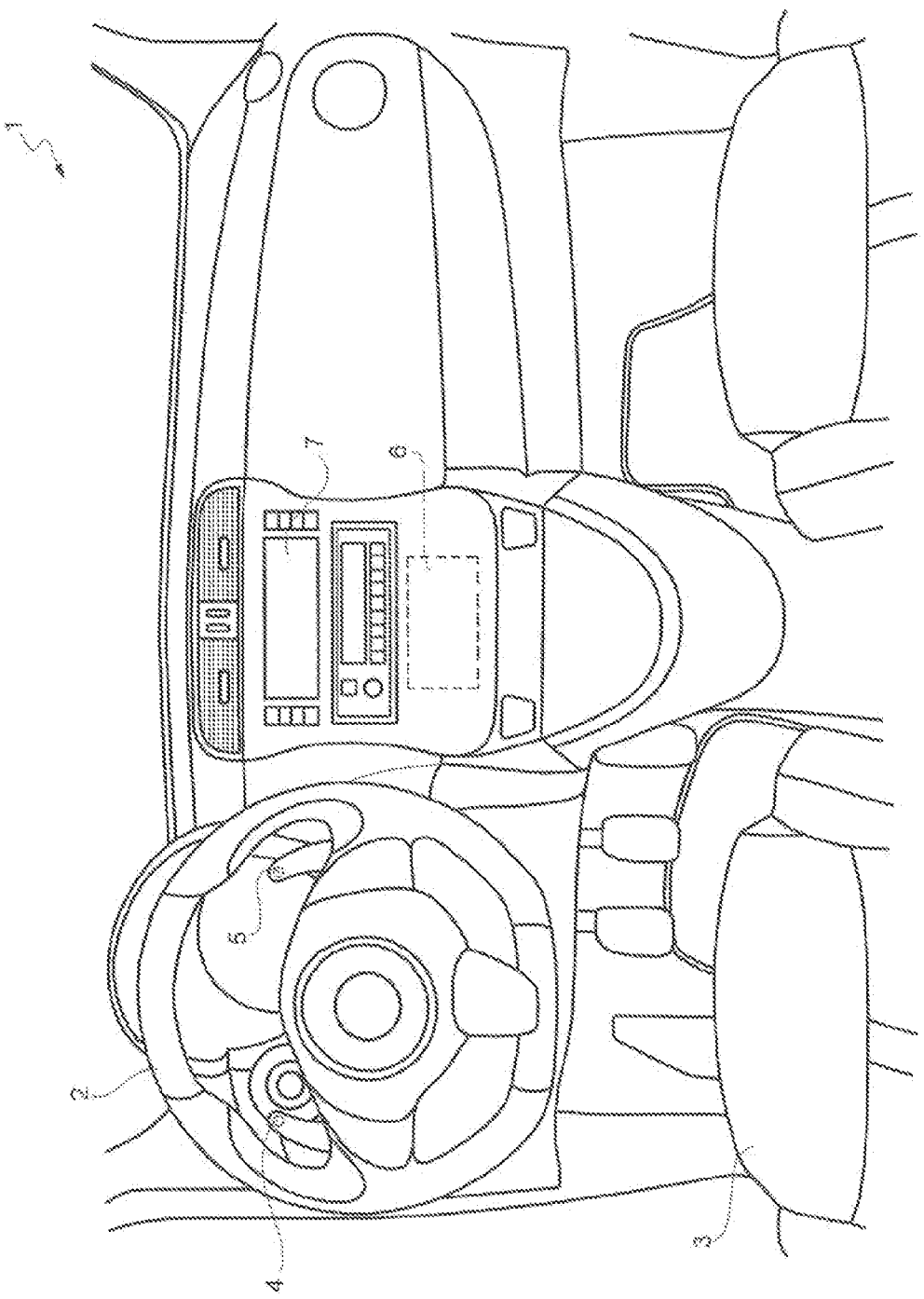

The following description is provided to allow a technician skilled in the sector to make and use the invention. Various modifications to the embodiments presented will be immediately apparent to skilled people and the generic principles disclosed herein may be applied to other embodiments and applications without departing the scope of protection of the present invention.

Therefore, the present invention is not to be intended as limited only to the embodiments described and shown, but is to be given the broadest scope of protection consistently with the principles and features presented herein and defined in the appended claims.

In general, the present invention relates to a gear shift system for a motor vehicle with a steering wheel. Said gear shift system comprises:
  gear shift devices rotationally integral with the steering wheel and arranged on, or behind, said steering wheel by different portions of said steering wheel, each of said gear shift devices being, thence, arranged by a respective portion of the steering wheel and being operable by a driver of the motor vehicle to carry out at least one respective gear shift function associated with said gear shift device; and
  an electronic control unit configured to
    receive a magnitude indicative of a current steering wheel angle,
    determine, on the basis of the received magnitude, whether the current steering wheel angle satisfies predefined conditions, and,
    if it determines that the current steering wheel angle satisfies the predefined conditions, reconfigure the gear shift functions associated with the gear shift devices.

For a better understanding of the present invention, FIGS. 1, 2, 3 and 4 show a passenger compartment 1 of a motor vehicle provided with:
  a gear shift system according to a preferred embodiment of the present invention (which will be described in detail below);
  an automatic automated servo-actuated transmission (not shown in FIGS. 1-4);
  one or more guiding (or leading) wheels (not shown in FIGS. 1-4); and
  a steering wheel 2 arranged by, in particular in front of, a seat 3 intended to be occupied, in use, by a driver (not shown in FIGS. 1-4 for the sake of illustration simplicity) of the motor vehicle.

In particular, the steering wheel 2 is part of a steering system of the motor vehicle which is coupled to the guiding wheel(s) and also includes a steering column (not shown in FIGS. 1-4 because arranged behind the steering wheel 2) rotatable in clockwise and counter-clockwise direction about a respective rotation axis. The steering wheel 2 is coupled to an upper end of the steering column so as to be rotationally integral with the latter and can be rotated by the driver to steer the guiding wheel(s) of the motor vehicle. The steering system is, thence, configured to steer the guiding wheel(s) in response to, and according to, the rotation of the steering column caused by the rotation given to the steering wheel 2 by the driver of the motor vehicle.

As shown in FIGS. 1-4, the gear shift system according to the aforesaid preferred embodiment of the present invention comprises a pair of gear shift devices in the form of paddles (denoted in FIGS. 1-4 by numerals 4 and 5) arranged behind the steering wheel 2 (in particular, each behind a respective spoke of the steering wheel 2) and rotationally integral with the latter. Conveniently, the paddles 4 and 5 are coupled to the steering column, behind the steering wheel 2, so as to be rotationally integral with said steering column and, thence, also with the steering wheel 2.

Figure 2:
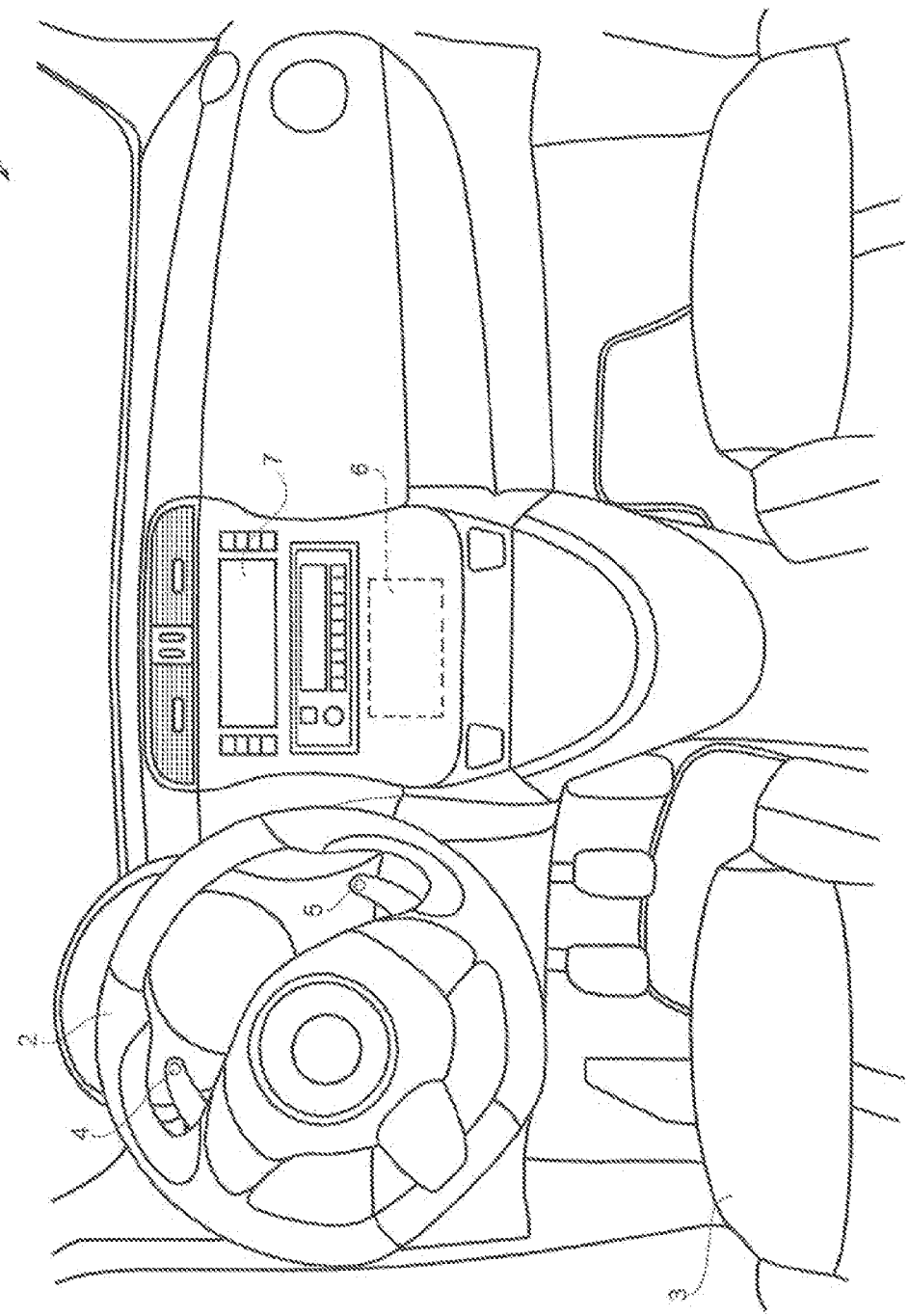
Figure 3:
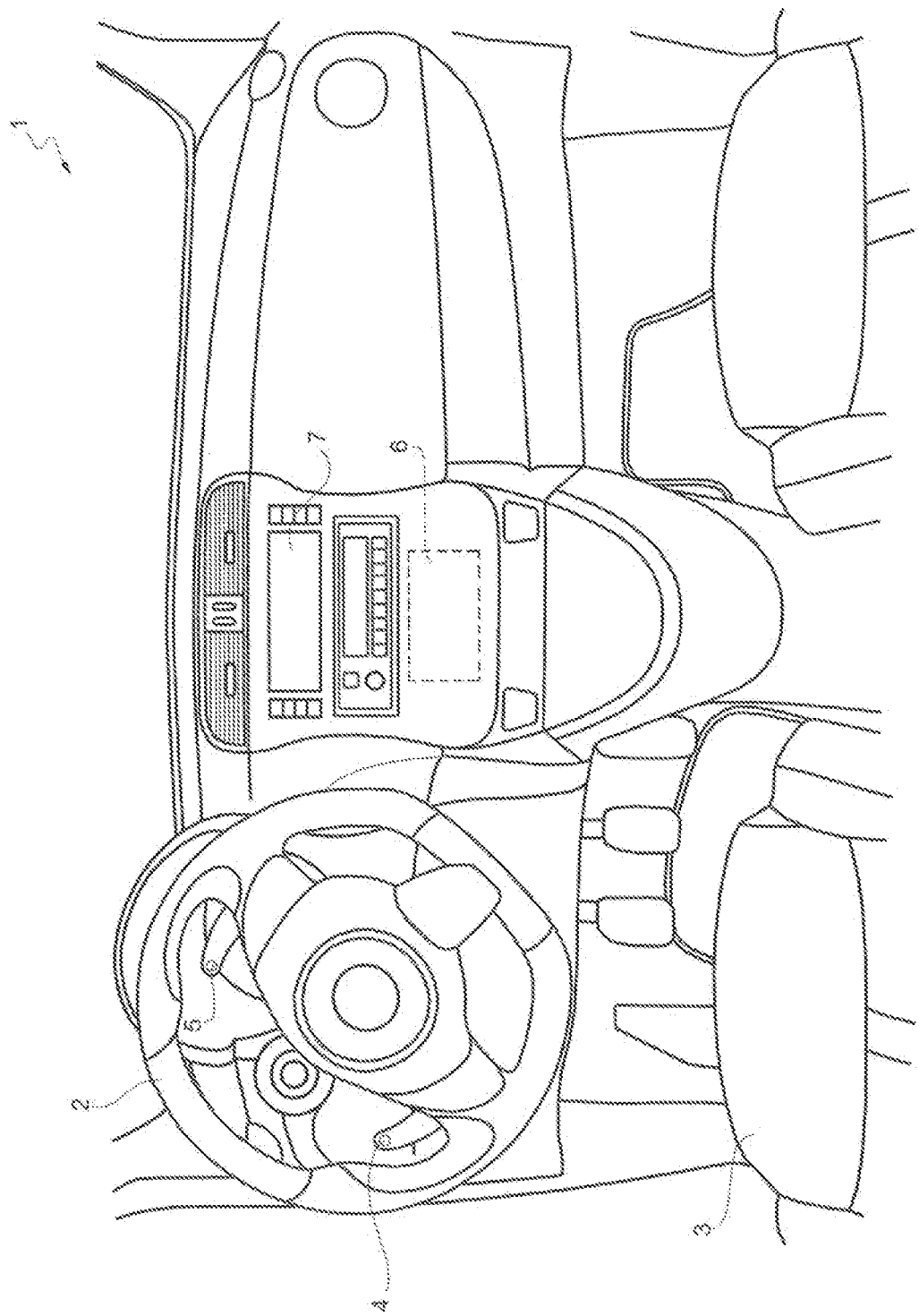
Figure 4:
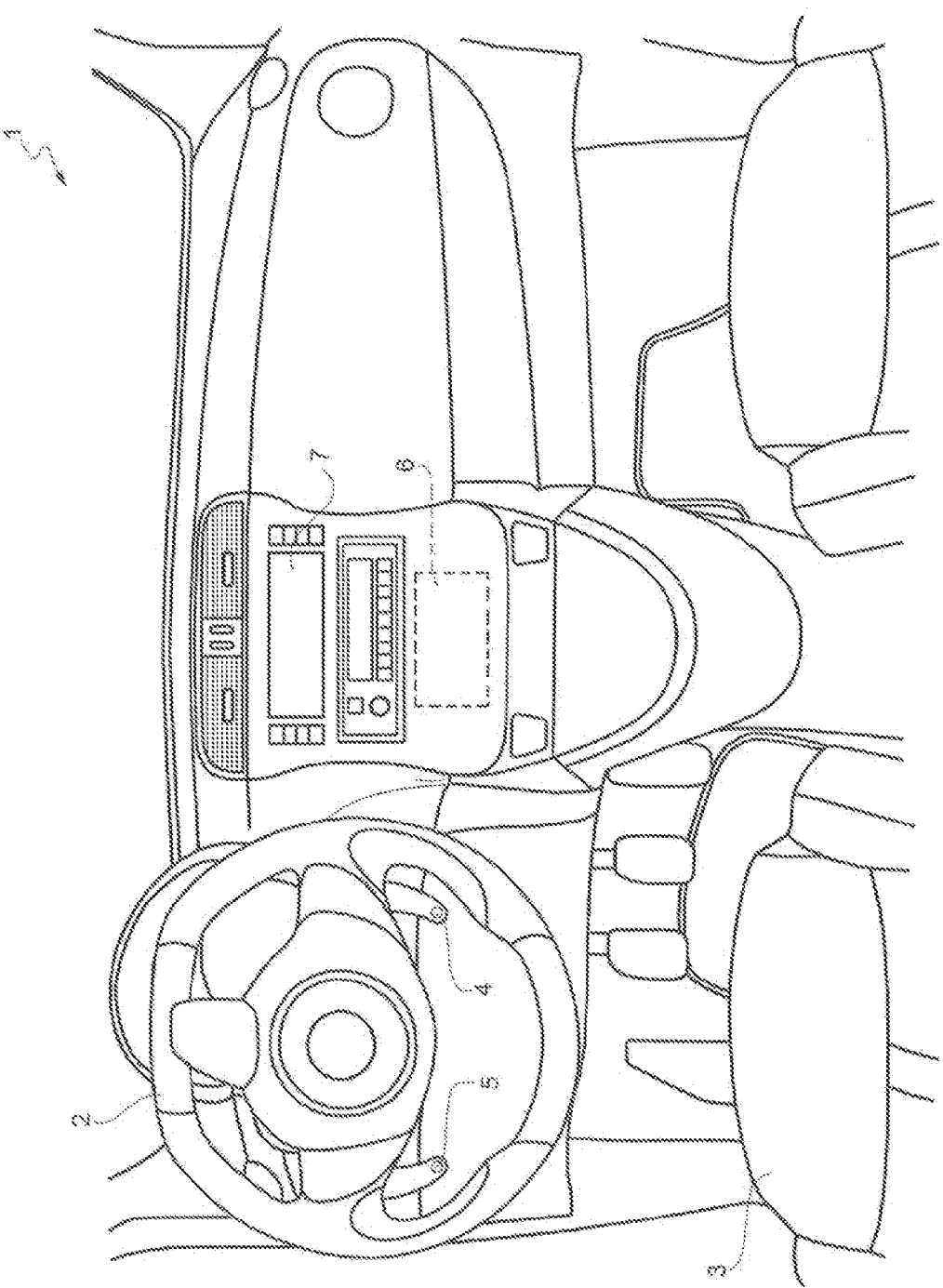

As shown in FIGS. 1-4, the paddle 4 is arranged by a first half of the steering wheel 2 (in particular, with specific reference to FIG. 1 and considering the point of observation of the driver, by the left half of the steering wheel 2) and the paddle 5 is arranged by the other half of the steering wheel 2 (in particular, again with specific reference to FIG. 1 and again considering the point of observation of the driver, by the right half of the steering wheel 2).

Since the paddles 4 and 5 are rotationally integral with the steering wheel 2, a rotation of said steering wheel 2 causes a corresponding rotation of the paddles 4 and 5, as shown in FIGS. 1-4. Indeed, in FIG. 2 the steering wheel 2 is shown clockwise rotated by 45° with respect to the angular position of said steering wheel 2 shown in FIG. 1, with the paddles 4 and 5 also clockwise rotated by 45° with respect to the respective angular positions shown in FIG. 1; in FIG. 3 the steering wheel 2 is shown counter-clockwise rotated by 45° with respect to the angular position of said steering wheel 2 shown in FIG. 1, with the paddles 4 and 5 also counter-clockwise rotated by 45° with respect to the respective angular positions shown in FIG. 1; and in FIG. 4 the steering wheel 2 is shown rotated by 180° in clockwise (or counter-clockwise) direction with respect to the angular position of said steering wheel 2 shown in FIG. 1, with the paddles 4 and 5 also rotated by 180° in clockwise (or counter-clockwise) direction with respect to the respective angular positions shown in FIG. 1.

By default, the paddle 4 is associated with a first gear shift function or a plurality of first gear shift functions, while the paddle 5 is associated with a second gear shift function or a plurality of second gear shift functions. For example, the first gear shift function(s) can conveniently be downshift function(s) and the second gear shift function(s) can conveniently be upshift function(s).

In particular, a single first gear shift function associated by default with the paddle 4 can conveniently be a sequential downshift function which is activatable by the driver by operating the paddle 4 and which, when activated, causes the engagement of the gear immediately below the current one (e.g., if the current gear is the fourth one, the sequential downshift function can conveniently cause, when activated, the third gear to be engaged). In the same manner, a single second gear shift function associated by default with the paddle 5 can conveniently be a sequential upshift function which is activatable by the driver by operating the paddle 5 and which, when activated, causes the engagement of the gear immediately above the current one (e.g., if the current gear is the fourth one, the sequential upshift function can conveniently cause, when activated, the fifth gear to be engaged).

Furthermore, in the case of a plurality of first/second gear shift functions associated by default with the paddle 4/5, each of said first/second gear shift functions can be conveniently activatable by the driver by operating said paddle 4/5 in a corresponding predefined mode. For example, the first/second gear shift functions can conveniently comprise:

a sequential down/upshift function which is activatable by the driver by hitting or touching the paddle 4/5 only once and which, when activated, causes the engagement of the gear immediately below/above the current one (for example, if the current gear is the third one, a sequential downshift function can conveniently cause, when activated, the second gear to be engaged); and an automatic down/upshift function which is activatable by the driver by hitting or touching the paddle 4/5 twice and which, when activated, causes the engagement, in rapid succession and according to a predefined gear shift scheme, of a plurality of gears below/above the current one (for example, if the current gear is third one, an automatic upshift function can conveniently cause, when activated, the engagement, in rapid succession, of the fourth gear and then of the fifth gear).

The first and the second gear shift functions described above only represent certain examples of gear down/upshift functions which may be conveniently associated with the paddles 4 and 5. In this respect, it is worth noting that other different down/upshift functions could be conveniently associated with the paddles 4 and 5 without however departing from the scope of protection of the present invention as defined in the appended claims.

Furthermore, the gear shift system according to the aforesaid preferred embodiment of the present invention also includes an electronic control unit 6 (depicted in FIGS. 1-4, for the sake of illustration simplicity, by means of a dotted line rectangle) which can be installed, as shown in FIGS. 1-4, under the dashboard of the motor vehicle, or in other positions in the motor vehicle, for example inside the steering wheel 2. Said electronic control unit 6 is connected to the paddles 4 and 5 and also to an automotive on-board communication network, e.g., CAN FlexRAy or others, through which it receives, in use, all the automotive magnitudes it requires to carry out the operations for which it is programmed.

In particular, said electronic control unit 6 stores at least one software code portion designed to carry out, when executed by the electronic control unit 6, the following operations:

receive, through the automotive on-board communication network, a quantity indicative of the current steering wheel angle α, of the current angle of rotation of the steering wheel 2 with respect to a predetermined angular reference position of the steering wheel 2 (for example, the angular position of the steering wheel 2 shown in FIG. 1 which causes the motor vehicle to go straight ahead);

determine, on the basis of the received magnitude indicative of the current steering wheel angle α, whether the current steering wheel angle α satisfies predefined conditions; and, if it determines that the current steering wheel angle α satisfies the predefined conditions, reconfigure the gear shift functions associated with the paddles 4 and 5.

In particular, the electronic control unit 6 is programmed (by means of the aforesaid software code portion) to determine that the current steering wheel angle satisfies the predefined conditions if it determines, on the basis of the received magnitude indicative of the current steering wheel angle α, that the absolute value |α| of the current steering wheel angle α exceeds a predefined threshold, for example a threshold of 90°.

Preferably, the electronic control unit 6 is programmed (by means of the aforesaid software code portion) to:

if it determines that the current steering wheel angle α does not satisfy the predefined conditions, maintain
the first gear shift function(s) associated with the paddle 4, and
the second gear shift function(s) associated with the paddle 5;

if it determines that the current steering wheel angle α satisfies the predefined conditions, associate
the second gear shift function(s) with the paddle 4, and
the first gear shift function(s) with the paddle 5.

Thus, when, in use, the driver of the motor vehicle rotates the steering wheel 2 by an angle $\alpha_1$ which does not satisfy the predefined conditions, for example by an angle $\alpha_1$ having an absolute value $|\alpha_1|<90°$ (situation shown in FIGS. 2 and 3), the electronic control unit 6 does not reconfigure the gear shift functions associated with the paddles 4 and 5, in particular, the electronic control unit 6 maintains the first gear shift function(s) associated with the paddle 4, and the second near shift function(s) associated with the paddle 5.

Instead, when, in use, the driver of the motor vehicle rotates the steering wheel 2 by an angle $\alpha_2$ which satisfies the predefined conditions, for example by an angle $\alpha_2$ having an absolute value $|\alpha_2|>90°$ (situation shown in FIG. 4), the electronic control unit 6 reconfigures the gear shift functions associated with the paddles 4 and 5, in particular, the electronic control unit 6 associates the second gear shift function(s) with the paddle 4, and the first gear shift function(s) with the paddle 5. In this way, when the current steering wheel angle α satisfies the predefined conditions, for example when there results $|\alpha|>90°$, the reconfiguration of the gear shift functions associated with the paddles 4 and 5 by the electronic control unit 6 prevents the driver from being confused and, thence, from causing the driver to erroneously operate the paddle 4 thinking that it is the paddle 5 and vice versa.

As is known, in modern motor vehicles, the steering wheel angle α is measured by means of one or more specific sensors, for example one or more Hall effect sensors, and it generally made available on the automotive on-board communication network to be used by one or more automotive on-board electronic control units to carry out respective functions, for example by an electronic unit dedicated to controlling the stability of the motor vehicle (ESP or ESC).

The electronic central control unit 6 can be an electronic unit specifically dedicated to the control of operation of the paddles 4 and 5, or the functions carried out by said electronic control unit 6 could be conveniently carried out by an on-board electronic control unit designed to carry out also other functions, for example by an electronic control unit designed to control the operation of the transmission or the powertrain of the motor vehicle.

Furthermore, the electronic control unit 6 is preferably also connected to user interface means operable by the driver to enable and disable the reconfiguration of the gear shift functions associated with the paddles 4 and 5 by the electronic central control unit 6. In this way, a driver, who wants that the paddles 4 and 5 are always associated with the same gear shift functions, can use the user interface means 7 to disable the reconfiguration of the gear shift functions by the electronic central control unit 6.

In particular, the user interface means 7 shown in FIGS. 1-4 are arranged on the dashboard of the motor vehicle and are made in the form of a screen provided with buttons. Conveniently, said user interface means 7 could also be made in the form of a touch screen also installed on the dashboard of the motor vehicle, or in the form of a simple button installed on the dashboard of the motor vehicle or on the steering wheel 2. Furthermore, the user interface means 7 can be user interface means dedicated only to the gear shift system according to the aforesaid preferred embodiment of the present invention, or the functions carried out by the user interface means 7 could be conveniently carried out by use interface means designed to carry out also other functions, for example by user interface means of an on-board info-telematic system of the motor vehicle.

Finally, it is worth noting that the gear shift devices rotationally integral with the steering wheel 2 could be conveniently made in the form of devices different from the paddles 4 and 5 described above and shown in FIGS. 1-4, without however departing from the scope of protection of the present invention as defined in the appended claims. In particular, the gear shift devices rotationally integral with the steering wheel 2 could be conveniently installed on the steering wheel 2 thereby being rotationally integral with the latter. For example, the gear shift devices rotationally integral with the steering wheel 2 could be conveniently made in the form of buttons arranged on the steering wheel 2.

The advantages of the present invention are immediately clear from the above description.

In particular, it is worth noting once again that the present invention solves the problem described above of the gear shift devices rotationally integral with the steering wheel thanks to the reconfiguration of the gear shift functions associated with such gear shift devices carried out by the electronic control unit. Indeed, such a reconfiguration carried out by the electronic control unit when the current steering wheel angle α satisfies the predefined conditions, prevents, when such predefined conditions occur, the driver from being confused and, therefore, from causing the driver to erroneously operate a gear shift device thinking that it is the other one.

In this respect, it is worth noting that the present invention solves the aforesaid problem in an alternative way with respect to currently known solutions, in particular in an alternative way with respect to the solution proposed in the Japanese Patent Application JP 2007069634 A.

Finally, it is clear that various modifications may be made to the present invention, all falling within the scope of protection of the invention as defined in the appended claims.

The invention claimed is:

1. A gear shift system for a motor vehicle with a steering wheel, comprising:
    gear shift devices rotationally integral with the steering wheel, each of said gear shift devices operable by a driver of the motor vehicle to carry out at least one respective gear shift function, said gear shift devices including a first gear shift device and a second gear shift device with at least a first gear shift function associated with said first gear shift device and at least a second gear shift function associated with said second gear shift device; and
    an electronic control unit configured to receive a magnitude indicative of a current steering wheel angle, determine, on the basis of the magnitude received, whether the current steering wheel angle satisfies predefined conditions, and, when said electronic control unit determines that the current steering wheel angle when said electronic control unit determines that the current steering wheel angle does not satisfy the predefined conditions, maintain the first gear shift function associated with the first gear shift device and the second gear shift function associated with the second gear shift device and when said electronic control unit determines that the current steering wheel angle satisfies the predefined conditions, reconfigure the gear shift functions associated with the gear shift devices by associating the second gear shift function with the first gear shift device and the first gear shift function with the second gear shift device.

2. The gear shift system of claim 1, wherein the first gear shift function is a downshift function and the second gear shift function is an upshift function.

3. The gear shift system according to claim 1, wherein the first gear shift device is arranged by a first half of the steering wheel and the second gear shift device is arranged by the other half of the steering wheel.

4. The gear shift system according to claim 1, wherein the electronic control unit is configured to determine that the current steering wheel angle satisfies the predefined conditions if it determines, on the basis of the received magnitude, that the absolute value of the current steering wheel angle exceeds a predefined threshold.

5. The gear shift system according to claim 1, comprising user interface means operable to enable and disable the reconfiguration of the gear shift functions associated with the gear shift devices by the electronic control unit.

6. The gear shift system according to claim 1, wherein the gear shift devices comprise gear shift paddles.

7. A motor vehicle, comprising:
    a steering wheel;
    a gear shift system comprising at least a first gear shift device that includes at least a first gear shift function and a second gear shift device that includes at least a second gear shift function with each of the first gear shift device and the second gear shift device being rotationally integral with the steering wheel and each of the first gear shift device and the second gear shift device being operable by a driver of the motor vehicle to carry out a respective gear shift function; and
    an electronic control unit configured to receive a magnitude indicative of a steering wheel angle, determine, on the basis of the magnitude received, whether the steering wheel angle satisfies predefined conditions and, when the electronic control unit determines that the steering wheel angle does not satisfy the predefined conditions, maintain the first gear shift function associated with the first gear shift device and the second gear shift function associated with the second gear shift device and when the electronic control unit determines that the current steering wheel angle satisfies the predefined conditions, reconfigure the gear shift functions associated with the gear shift devices by associating the second gear shift function with the first gear shift device and the first gear shift function with the second gear shift device.

8. A motor vehicle, comprising:
a gear shift system comprising gear shift devices, including a first gear shift device and a second gear shift device that are each rotationally integral with a steering wheel and operable by a driver of the motor vehicle to carry out at least one respective gear shift function with at least a first gear shift function associated with the first gear shift device and at least a second gear shift function associated with the second gear shift device; and an electronic control unit configured to receive a magnitude indicative of a steering wheel angle, determine, on a basis of the magnitude received, whether the steering wheel angle satisfies predefined conditions and, when the electronic control unit determines that the steering wheel angle does not satisfy the predefined conditions, maintain the first gear shift function associated with the first gear shift device and the second gear shift function associated with the second gear shift device and when the electronic control unit determines that the steering wheel angle satisfies the predefined conditions, reconfigure the gear shift functions associated with the gear shift devices by associating the second gear shift function with the first gear shift device and the first gear shift function with the second gear shift device.

* * * * *